US012635048B2

(12) United States Patent
Liang et al.

(10) Patent No.: US 12,635,048 B2
(45) Date of Patent: May 19, 2026

(54) LAMP CONTROL SIGNAL CONVERSION AND TRANSMISSION METHOD AND LAMP SYSTEM USING THE SAME

(71) Applicant: Guangzhou Rising Dragon Recreation Industrial Co., Ltd., Guangzhou (CN)

(72) Inventors: Bo Liang, Guangzhou (CN); Ziqin Guo, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 120 days.

(21) Appl. No.: 18/830,612

(22) Filed: Sep. 11, 2024

(65) Prior Publication Data

US 2026/0006693 A1 Jan. 1, 2026

(30) Foreign Application Priority Data

Jun. 28, 2024 (CN) ......................... 202410858218.4

(51) Int. Cl.
*H05B 45/24* (2020.01)
*H05B 45/12* (2020.01)
*H05B 47/19* (2020.01)

(52) U.S. Cl.
CPC .................................... *H05B 45/24* (2020.01)

(58) Field of Classification Search
CPC ........ H05B 45/20; H05B 47/19; H05B 45/12; H05B 47/1965; H05B 47/1985; H05B 47/16
See application file for complete search history.

(56) References Cited

U.S. PATENT DOCUMENTS

| | | | | |
|---|---|---|---|---|
| 2024/0292504 | A1* | 8/2024 | Brandl | H05B 45/325 |
| 2025/0176081 | A1* | 5/2025 | Wang | H05B 45/14 |

* cited by examiner

*Primary Examiner* — Wei (Victor) Y Chan
(74) *Attorney, Agent, or Firm* — Frank Niranjan

(57) ABSTRACT

A lamp control signal conversion and transmission method includes: R coded data, G coded data and B coded data generated in three successive sampling periods $T_0$ being transmitted in each transmission period $T_1$ respectively in a first preset sequence, a second preset sequence and a third preset sequence, and colors correspondingly controlled by coded data that is first transmitted in the first preset sequence, the second preset sequence and the third preset sequence are different, such that even if only the first color coded data can be transmitted due to the incompleteness of output color data caused by insufficient power supply when the duty cycle of lamp control signals is low in the process of converting four-wire transmission of the lamp control signals into two-wire transmission, the R, G and B coded data can still be obtained three sampling periods $T_0$ later, which improves completeness of colors of a lamp.

7 Claims, 4 Drawing Sheets

LAMP CONTROL SIGNAL CONVERSION AND TRANSMISSION METHOD AND LAMP SYSTEM USING THE SAME

FIELD

The invention relates to the technical field of lamp signal transmission, in particular to a lamp control signal conversion and transmission method and a lamp system using the same.

BACKGROUND

A conventional LED lamp driving circuit often adopts four wires to drive a lamp. To simplify installation, lamp control signals that are transmitted by four wires may be integrated with a power supply and be converted by a conversion module to be transmitted by two wires, and to reduce costs, the conversion module is generally not connected to an external power supply.

However, because power for normal operation and output of the conversion module is supplied by light control signals, when the duty cycle of the lamp control signals is too low, power supplied to the conversion module will be insufficient, making output color data incomplete. Referring to FIG. 1, in a case where output color data is incomplete due to an excessively low duty cycle of light control signals, because R color data, G color data and B color data are sequentially and cyclically transmitted in the prior art, a lamp may only receive data that is first transmitted (R color data), and at this moment, the lamp will only display the red color and will not display the green color and the blue color, leading to incomplete light color display of the lamp.

SUMMARY

In view of the problem that output data is incomplete due to insufficient power supply to a module in case of a low duty cycle of lamp control signals when lamp control signals, which are transmitted by four wires, are integrated with a power supply and converted to be transmitted by two wires in the prior art, the invention provides a lamp control signal conversion and transmission method and a lamp system using the same to solve, at a low cost, the problem of the loss of colors in case of a low duty cycle.

In one aspect, the present invention provides a lamp control signal conversion and transmission method, comprising:

S1: synchronously sampling, within a preset sampling period $T_0$, level states of R (red), G (green) and B (blue) lamp control signals in a four-wire system to obtain the level states of current R, G and B lamp control signals, wherein the level states comprise a high level and a low level;

S2: when every time sampling is completed, respectively generating, according to the level states of the lamp control signals, R coded data, G coded data and B coded data that correspond to R, G and B control information carried by the level states of the three lamp control signals; and S3: transmitting, in each presetting transmission period $T_1$, the R coded data, the G coded data and the B coded data generated in any three successive sampling periods $T_0$ respectively in a first preset sequence, a second preset sequence and a third preset sequence; and integrating the R coded data, the G coded data and the B coded data into RGB coded data and outputting the RGB coded data by a two-wire system, wherein colors correspondingly controlled by coded data that is first transmitted in the first preset sequence, the second preset sequence and the third preset sequence are different.

In some embodiments, a color correspondingly controlled by coded data that is second transmitted in the first preset sequence is the same as a color correspondingly controlled by coded data that is first transmitted in the third preset sequence; a color correspondingly controlled by coded data that is second transmitted in the second preset sequence is the same as a color correspondingly controlled by coded data that is first transmitted in the first preset sequence; and a color correspondingly controlled by coded data that is second transmitted in the third preset sequence is the same as color correspondingly controlled by coded data that is first transmitted in the second preset sequence.

In some embodiments, the transmission period satisfies $T_1=3T_0$; in the first preset sequence, the R coded data, the G coded data and the B coded data are transmitted sequentially; in the second preset sequence, the B coded data, the R coded data and the G coded data are transmitted sequentially; and in the third preset sequence, the G coded data, the B coded data and the R coded data are transmitted sequentially.

In some embodiments, a color correspondingly controlled by coded data that is second transmitted in the first preset sequence is the same as a color correspondingly controlled by coded data that is third transmitted in the third preset sequence; a color correspondingly controlled by coded data that is second transmitted in the second preset sequence is the same as a color correspondingly controlled by coded data that is third transmitted in the first preset sequence; and a color correspondingly controlled by coded data that is second transmitted in the third preset sequence is the same as a color correspondingly controlled by coded data that is third transmitted in the second preset sequence.

In some embodiments, the transmission period satisfies $T_1=3T_0$; in the first preset sequence, the R coded data, the G coded data and the B coded data are transmitted sequentially; in the second preset sequence, the G coded data, the B coded data and the R coded data are transmitted sequentially; and in the third preset sequence, the B coded data, the R coded data and the G coded data are transmitted sequentially.

In some embodiments, the lamp control signal conversion and transmission method further comprising:

S4: receiving and decoding the RGB coded data by the two-wire system to obtain the R, G and B control information carried by the R coded data, the G coded data and the B coded data in the RGB coded data, and outputting R, G and B control signals based on the R, G and B control information to control a corresponding R-LED lamp bank, G-LED lamp bank or B-LED lamp bank in a lamp.

In another aspect, the present invention provides a lamp system comprising a four-wire system input module, a control signal conversion module, a two-wire system transmission module and a plurality of lamp modules that are electrically connected in sequence. The four-wire system input module is configured for generating R, G and B lamp control signals; the signal conversion module is configured for implementing the lamp control signal conversion and transmission method according to claim 1, and outputting the RGB coded data to the two-wire system transmission module; the two-wire system transmission module comprises a positive wire and a negative wire that are connected to an output terminal of the signal conversion module, and is used for transmitting the RGB coded data and outputting the RGB coded data to the lamp modules; and each of the lamp modules comprises a decoding unit and a lamp, wherein the decoding unit is used for receiving and decoding the RGB coded data to obtain R, G and B control information carried by R coded data, G coded data and B coded data in the RGB coded data, and outputting R, G and B control signals based on the R, G and B control information to control a corresponding R-LED lamp bank, G-LED lamp bank or B-LED lamp bank in the lamp.

The invention has the following beneficial effects: according to the lamp control signal conversion and transmission method and the lamp system using the same provided by the invention, R coded data, G coded data and B coded data generated in any three successive sampling periods $T_0$ are transmitted in each transmission period $T_1$ respectively in a first preset sequence, a second preset sequence and a third preset sequence, and the colors correspondingly controlled by coded data that is first transmitted in the first preset sequence, the second preset sequence and the third preset sequence are different, such that even if only the first color coded data can be transmitted due to the incompleteness of output color data caused by insufficient power supply when the duty cycle of lamp control signals is low in the process of converting four-wire transmission of the lamp control signals into two-wire transmission, the R, G and B coded data can still be obtained three sampling periods $T_0$ later, thus guaranteeing the completeness of the colors of a lamp, avoiding the loss of a certain color, solving the problem of the loss of colors caused by incomplete color data output in case of a low duty cycle; and the lamp control signal conversion and transmission method is easy to operate, effective, high in practicability, free of an external power supply, low in cost, and wide in application range.

REFERENCE SIGNS

1, four-wire system input module; 2, signal conversion module; 3, two-wire system output module; 4, lamp module.

DESCRIPTION OF THE EMBODIMENTS

The invention is described in further detail below in conjunction with accompanying drawings. It should be particularly noted that the embodiments in the following description are merely illustrative ones and are not all possible ones of the invention. All other embodiments obtained by those ordinarily skilled in the art based on the following ones without creative labor should also fall within the protection scope of the invention.

Embodiment 1

Figure 1:
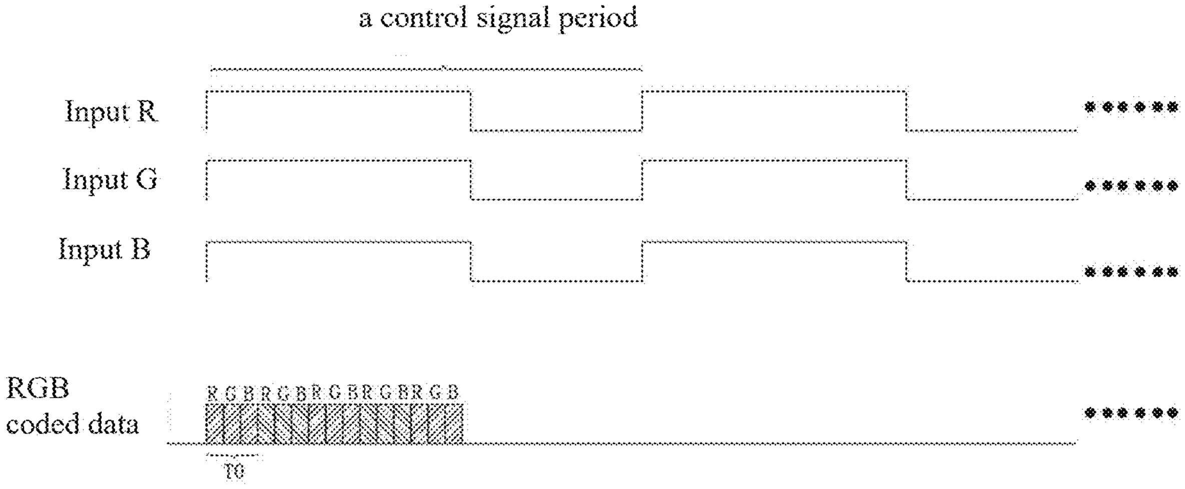
FIG. 1 is a schematic principle diagram of lamp control signal conversion and transmission in the prior art.
Figure 2:
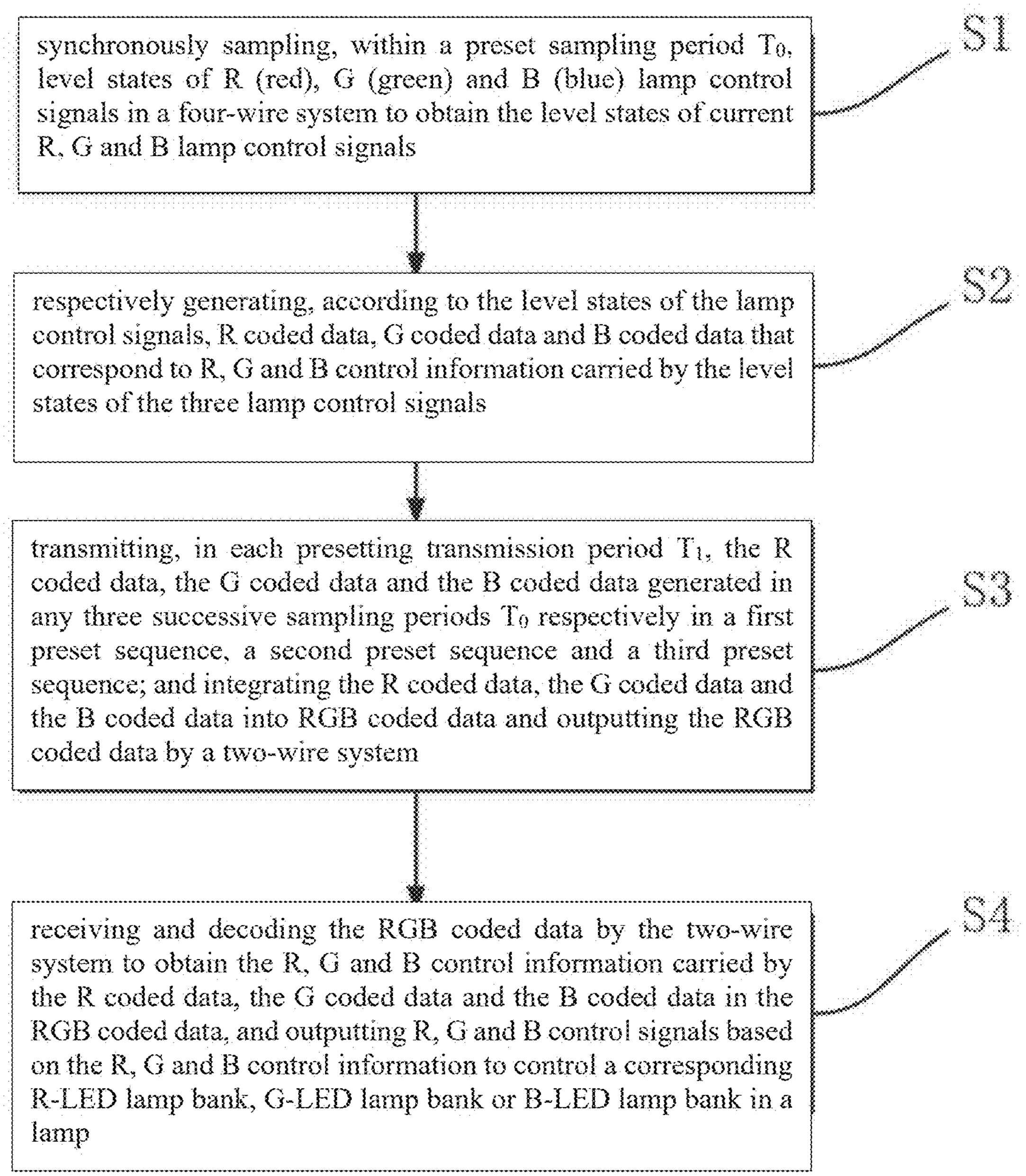
FIG. 2 is a schematic flow diagram of a lamp control signal conversion and transmission method according to the invention.

Referring to FIG. 2, to solve the problem of the loss of colors caused by a low duty cycle of lamp control signals when the lamp control signals transmitted by four wires are integrated with a power supply and converted to be transmitted by two wires, the present invention provides a lamp control signal conversion and transmission method, comprising the following steps:

S1: obtaining level states of current R (red), G (green) and B (blue) lamp control signals by sampling the level states of the R, G and B lamp control signals in a four-wire system synchronously within a preset sampling period $T_0$, wherein the lamp control signals are level signals, and the level states comprise a high level and a low level. The synchronous sampling way can accurately capture the level state of each lamp control signal to avoid a delay caused by a deviation of the sampling time. In this embodiment, the R, G, and B lamp control signals have the same period $T_2$.

S2: generating R coded data, G coded data and B coded data that correspond to R, G and B control information carried by the level states of the three lamp control signals respectively according to the level states of the three lamp control signals when every sampling step is completed.

In this embodiment, in a case where the level state of the R lamp control signal is a high level, the R coded data is 1; and in a case where the signal state of the R lamp control signal is a low level, the R coded data is 0.

S3: the R coded data, the G coded data and the B coded data generated in any three successive sampling periods $T_0$ being transmitted in each preset transmission period $T_1$ respectively in a first preset sequence, a second preset sequence and a third preset sequence and then integrated into RGB coded data to be output by a two-wire system. In this embodiment, the period of the R, G and B lamp control signals satisfies $T_2=NT_0$.

Figure 3:
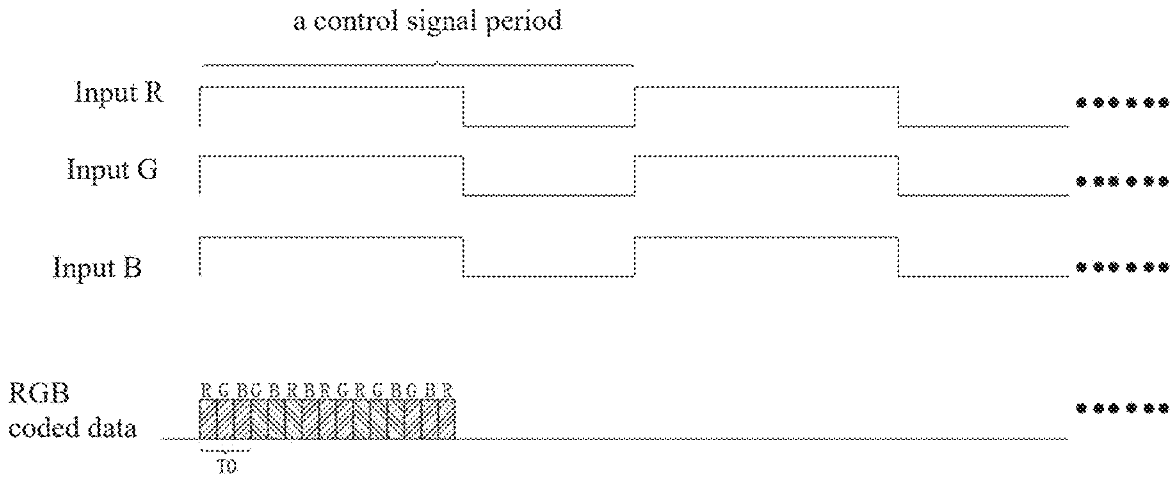
FIG. 3 is a schematic principle diagram of signal conversion and transmission of the lamp control signal conversion and transmission method according to Embodiment 1 of the invention.

Specifically, referring to FIGS. 2 and 3, colors corresponding to the first transmitted coded data in the first preset sequence, the second preset sequence and the third preset sequence are different. For example, when coded data that is first transmitted in the first preset sequence is the R coded data and coded data that is first transmitted in the second preset sequence is the G coded data, coded data that is first transmitted in the third preset sequence is the B coded data.

The R coded data, the G coded data and the B coded data generated in any three successive sampling periods $T_0$ are transmitted in each transmission period $T_1$ respectively in the first preset sequence, the second preset sequence and the third preset sequence and are integrated into RGB coded data that is output by the two-wire system, such that system transformation from the four-wire system to the two-wire system is realized. Moreover, the colors correspondingly controlled by coded data that is first transmitted in the first preset sequence, the second preset sequence and the third preset sequence are different, such that even if only the first color coded data can be transmitted due to the incompleteness of output color data caused by insufficient power supply when the duty cycle of lamp control signals is low in the process of converting four-wire transmission of the lamp control signals into two-wire transmission, the R, G and B coded data can still be obtained three sampling periods $T_0$ later, thus guaranteeing the completeness of the colors of a lamp, avoiding the loss of a certain color, and solving the problem of the loss of colors caused by incomplete color data output in case of a low duty cycle.

Wherein, in S3, a color correspondingly controlled by coded data that is second transmitted in the first preset sequence is the same as a color correspondingly controlled by coded data that is third transmitted in the third preset sequence; a color correspondingly controlled by coded data that is second transmitted in the second preset sequence is the same as a color correspondingly controlled by coded data that is third transmitted in the first preset sequence; and a color correspondingly controlled by coded data that is second transmitted in the third preset sequence is the same as a color correspondingly controlled by coded data that is third transmitted in the second preset sequence. For example, in a case where coded data that is first transmitted in the first preset sequence is the R coded data, coded data that is first transmitted in the second preset sequence is the G coded data and coded data that is first transmitted in the third preset sequence is the B coded data, coded data that is second transmitted in the first preset sequence is the G coded data, coded data that is second transmitted in the second preset sequence is the B coded data, and coded data that is second transmitted in the third preset sequence is the R coded data.

In this embodiment, the transmission period satisfies $T_1=3T_0$; in the first preset sequence, the R coded data, the G coded data and the B coded data are transmitted sequentially; in the second preset sequence, the G coded data, the B coded data and the R coded data are transmitted sequentially; and in the third preset sequence, the B coded data, the R coded data and the G coded data are transmitted sequentially.

S4: the two-wire system receiving and decoding the RGB coded data to obtain the R, G and B control information carried by the R coded data, the G coded data and the B coded data in the RGB coded data, and R, G and B control signals based on the R, G and B control information being output to control a corresponding R-LED lamp bank, G-LED lamp bank or B-LED lamp bank in a lamp.

Embodiment 2

Figure 4:
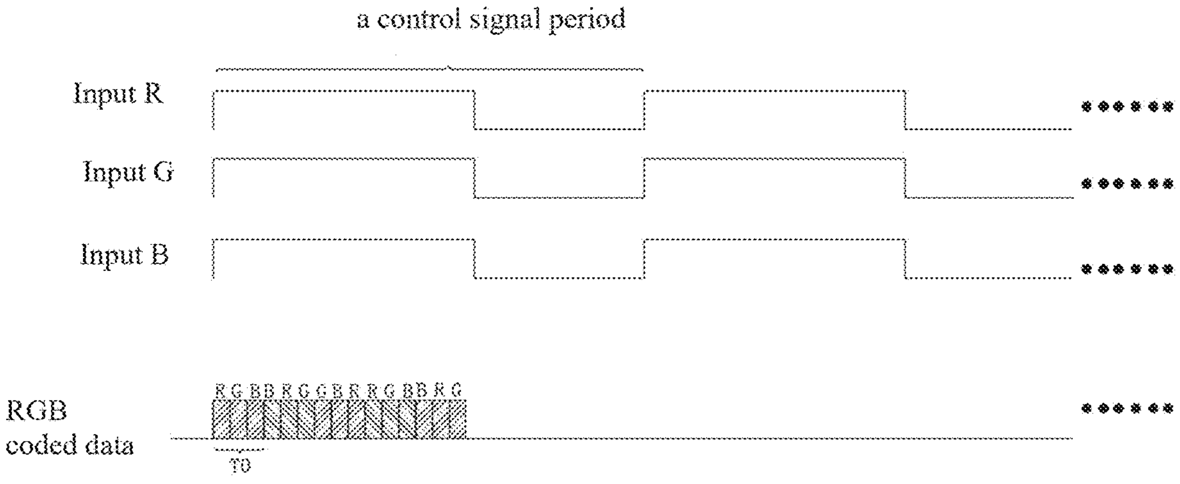
FIG. 4 is a schematic principle diagram of signal conversion and transmission of the lamp control signal conversion and transmission method according to Embodiment 2 of the invention.

Referring to FIG. 2 and FIG. 4, Embodiment 2 is different from Embodiment 1 in the following aspects: in S3, a color correspondingly controlled by coded data that is second transmitted in the first preset sequence is the same as a color correspondingly controlled by coded data that is first transmitted in the third preset sequence; a color correspondingly controlled by coded data that is second transmitted in the second preset sequence is the same as a color correspondingly controlled by coded data that is first transmitted in the first preset sequence; and a color correspondingly controlled by coded data that is second transmitted in the third preset sequence is the same as a color correspondingly controlled by coded data that is first transmitted in the second preset sequence.

For example, in a case where coded data that is first transmitted in the first preset sequence is the R coded data, coded data that is first transmitted in the second preset sequence is the B coded data and coded data that is first transmitted in the third preset sequence is the G coded data, coded data that is second transmitted in the first preset sequence is the G coded data, coded data that is second transmitted in the second preset sequence is the R coded data, and coded data that is second transmitted in the third preset sequence is the B coded data.

In this embodiment, the transmission period satisfies $T_1=3T_0$; in the first preset sequence, the R coded data, the G coded data and the B coded data are transmitted sequentially; in the second preset sequence, the B coded data, the R coded data and the G coded data are transmitted sequentially; and in the third preset sequence, the G coded data, the B coded data and the R coded data are transmitted sequentially.

By adopting the coded data transmission method in Embodiment 2, the situation where output color coded data is incomplete due to insufficient power supply can be avoided, and in a case where only the first color coded data can be transmitted, the R, G and B coded data all can still be obtained three sampling periods $T_0$ later, thus solving the problem of the loss of colors. Moreover, because the color correspondingly controlled by the coded data that is third transmitted in the first sequence is the same as the color correspondingly controlled by the coded data that is first transmitted in the second sequence and the color correspondingly controlled by the coded data that is third transmitted in the second sequence is the same as the color correspondingly controlled by the coded data that is first transmitted in the third sequence, the coded data correspondingly controls the same color within adjacent sampling periods $T_0$, and the coded data continuously controls the same color and does not need to switch to control other colors, such that the data transmission quantity is reduced, the data transmission time is shortened, and signal transmission interference is reduced relatively.

The lamp control signal conversion and transmission method provided by this embodiment is easy to operate, effective and low in cost, and solves the technical problem of insufficient power supply caused by a low duty cycle of lamp control signals without being connected to multiple external power supply modules; and the loss of colors caused by incomplete output color data is avoided, thus ensuring the completeness of light color output by a lamp and guaranteeing the light effect.

Embodiment 3

Figure 5:
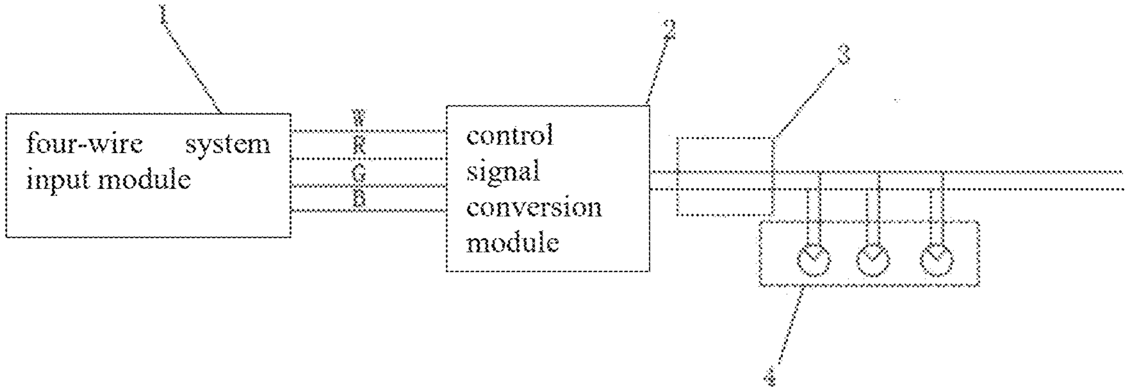
FIG. 5 is a schematic structural diagram of a lamp system according to the invention.

Referring to FIGS. 2 and 5, a lamp system comprises a four-wire system input module 1, a control signal conversion module 2, a two-wire system transmission module 3, and a plurality of lamp modules 4 that are electrically connected in sequence.

The four-wire system input module 1 is configured to generate R, G, and B lamp control signals.

The control signal conversion module 2 is configured to implement the lamp control signal conversion and transmission method described in any one of the above embodiments and to output RGB-coded data to the two-wire system transmission module.

The two-wire system transmission module 3 comprises a positive wire and a negative wire that are connected to an output terminal of the signal conversion module and is used for transmitting the RGB coded data and outputting the RGB coded data to the lamp modules.

Figure 6:
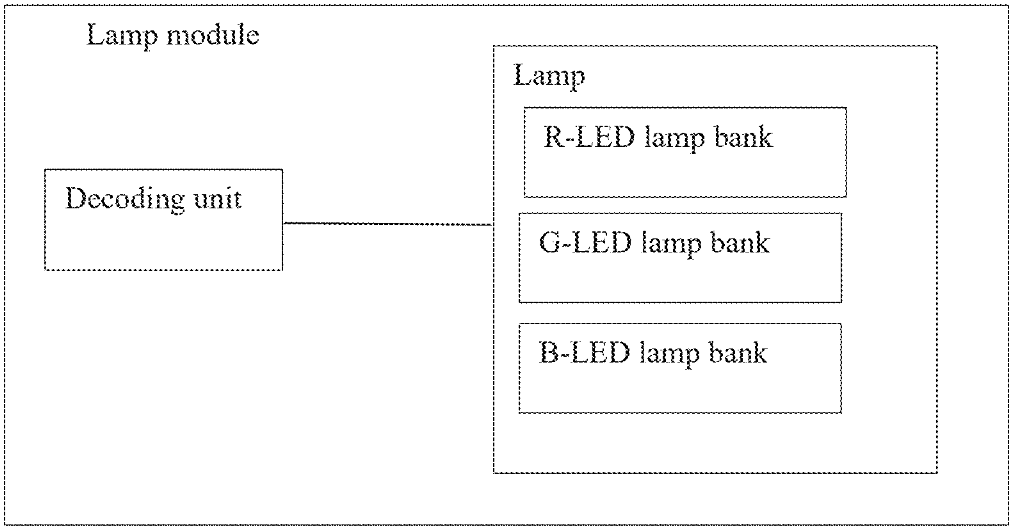
FIG. 6 illustrate a lamp module.

Referring to FIG. 6, each of the lamp modules 4 comprises a decoding unit and a lamp, wherein the decoding unit is used for receiving and decoding the RGB coded data to obtain R, G and B control information carried by R coded data, G coded data and B coded data in the RGB coded data, and outputting R, G and B control signals based on the R, G and B control information to control a corresponding R-LED lamp bank, G-LED lamp bank or B-LED lamp bank in the lamp.

The four-wire system input module generates three first lamp control signals, and the signal conversion module periodically transmits three color coded data according to the lamp control signal conversion and transmission method according to any one of the above embodiments and integrates the three color coded data into RGB coded data that is output to the two-wire system output module, such that system transformation from a four-wire system to a two-wire system is realized; and the decoding unit receives and decodes the RGB coded data and outputs R, G and B control signals to control the corresponding R-LED lamp bank, G-LED lamp bank or B-LED lamp bank in the lamp. In a case where only the first color coded data can be transmitted due to the incompleteness of output coded data caused by an insufficient power supply, the decoding unit can still obtain R, G and B coded data three sampling periods $T_0$ later, such that R, G and B colors can be output without an external power supply module, the loss of a certain color of the lamp is avoided, the completeness of the colors of the lamp is guaranteed, and the use cost is greatly reduced.

The protection scope of the invention should be defined by the appended claims. For those ordinarily skilled in the art, some improvements and embellishments can be made without departing from the spirit and scope of the invention, and all these improvements and embellishments should also fall within the protection scope of the invention.

What is claimed is:

1. A lamp control signal conversion and transmission method, comprising:

S1: synchronously sampling, within a preset sampling period $T_0$, level states of R (red), G (green) and B (blue) lamp control signals in a four-wire system to obtain the level states of current R, G and B lamp control signals, wherein the level states comprise a high level and a low level;

S2: respectively generating, according to the level states of the lamp control signals, R coded data, G coded data and B coded data that correspond to R, G and B control information carried by the level states of the three lamp control signals; and S3: transmitting, in each presetting transmission period $T_1$, the R coded data, the G coded data and the B coded data generated in any three successive sampling periods $T_0$ respectively in a first preset sequence, a second preset sequence and a third preset sequence; and integrating the R coded data, the G coded data and the B coded data into RGB coded data and outputting the RGB coded data by a two-wire system, wherein colors correspondingly controlled by coded data that is first transmitted in the first preset sequence, the second preset sequence and the third preset sequence are different.

2. The lamp control signal conversion and transmission method according to claim 1, wherein a color correspondingly controlled by coded data that is second transmitted in the first preset sequence is the same as a color correspondingly controlled by coded data that is first transmitted in the third preset sequence;

a color correspondingly controlled by coded data that is second transmitted in the second preset sequence is the same as a color correspondingly controlled by coded data that is first transmitted in the first preset sequence; and a color correspondingly controlled by coded data that is second transmitted in the third preset sequence is the same as color correspondingly controlled by coded data that is first transmitted in the second preset sequence.

3. The lamp control signal conversion and transmission method according to claim 2, wherein the transmission period satisfies $T_1=3T_0$;

in the first preset sequence, the R coded data, the G coded data and the B coded data are transmitted sequentially;

in the second preset sequence, the B coded data, the R coded data and the G coded data are transmitted sequentially; and in the third preset sequence, the G coded data, the B coded data and the R coded data are transmitted sequentially.

4. The lamp control signal conversion and transmission method according to claim 1, wherein a color correspondingly controlled by coded data that is second transmitted in the first preset sequence is the same as a color correspondingly controlled by coded data that is third transmitted in the third preset sequence;

a color correspondingly controlled by coded data that is second transmitted in the second preset sequence is the same as a color correspondingly controlled by coded data that is third transmitted in the first preset sequence; and a color correspondingly controlled by coded data that is second transmitted in the third preset sequence is the same as a color correspondingly controlled by coded data that is third transmitted in the second preset sequence.

5. The lamp control signal conversion and transmission method according to claim 4, wherein the transmission period satisfies $T_1=3T_0$;

in the first preset sequence, the R coded data, the G coded data and the B coded data are transmitted sequentially;

in the second preset sequence, the G coded data, the B coded data and the R coded data are transmitted sequentially; and in the third preset sequence, the B coded data, the R coded data and the G coded data are transmitted sequentially.

6. The lamp control signal conversion and transmission method according to claim 1, further comprising:

S4: receiving and decoding the RGB coded data by the two-wire system to obtain the R, G and B control information carried by the R coded data, the G coded data and the B coded data in the RGB coded data, and outputting R, G and B control signals based on the R, G and B control information to control a corresponding R-LED lamp bank, G-LED lamp bank or B-LED lamp bank in a lamp.

7. A lamp system comprising a four-wire system input module, a control signal conversion module, a two-wire system transmission module and a plurality of lamp modules that are electrically connected in sequence; wherein:

the four-wire system input module is configured for generating R, G and B lamp control signals;

the signal conversion module is configured for implementing the lamp control signal conversion and transmission method according to claim 1, and outputting the RGB coded data to the two-wire system transmission module;

the two-wire system transmission module comprises a positive wire and a negative wire that are connected to an output terminal of the signal conversion module, and is used for transmitting the RGB coded data and outputting the RGB coded data to the lamp modules; and each of the lamp modules comprises a decoding unit and a lamp, wherein the decoding unit is used for receiving and decoding the RGB coded data to obtain R, G and B control information carried by R coded data, G coded data and B coded data in the RGB coded data, and outputting R, G and B control signals based on the R, G and B control information to control a corresponding R-LED lamp bank, G-LED lamp bank or B-LED lamp bank in the lamp.

* * * * *